US006852799B2

(12) United States Patent
Baidak et al.

(10) Patent No.: US 6,852,799 B2
(45) Date of Patent: Feb. 8, 2005

(54) UNIVERSAL COMPATIBILIZING AGENT FOR POLYOLEFINES AND POLAR PLASTICS

(75) Inventors: Alexandre Baidak, Guisborough (GB); Christine Brassine, Habay-la-Vieille (BE); Jean-Marie Liegeois, Charneux (BE); Trazollah Ouhadi, Liège (BE)

(73) Assignee: Universite de Liege, Liege (BE)

( * ) Notice: Subject to any disclaimer, the term of this patent is extended or adjusted under 35 U.S.C. 154(b) by 0 days.

(21) Appl. No.: 10/380,046

(22) PCT Filed: Sep. 10, 2001

(86) PCT No.: PCT/EP01/10444

§ 371 (c)(1),
(2), (4) Date: Mar. 11, 2003

(87) PCT Pub. No.: WO02/20644

PCT Pub. Date: Mar. 14, 2002

(65) Prior Publication Data

US 2004/0014884 A1 Jan. 22, 2004

Related U.S. Application Data

(60) Provisional application No. 60/231,902, filed on Sep. 11, 2000.

(51) Int. Cl.[7] .......................... C08G 81/00; C08L 51/06
(52) U.S. Cl. .............................. 525/74; 525/78; 525/80; 525/87; 525/310
(58) Field of Search ............................ 525/74, 78, 80, 525/87, 310, 301

(56) References Cited

FOREIGN PATENT DOCUMENTS

EP           0335649 A2    10/1989

OTHER PUBLICATIONS

Modification of Polyamide by a Crystalline Polyolefin and Graft Copolymer, 2244 Research Disclosure (1991), Dec., No. 332.

Polypropylene/Polar Polymer Blends, 2244 Research Disclosure, (1991), Oct., No. 330.

Creton et al, MACROMOLECULES, 25, 1992, pp. 3075–3088, Failure Mechanisms of Polymer Interfaces Reinforced with Block Polymers.

Anastasiadis et al, MACROMOLECULES, 22, 1989, pp. 1449–1453, Compatibilizing Effect of Block Copolymers Added to the . . .

Database WPI, Derwent Publications Ltd. XP002190638 and JP 05345868A (Kuraray Co Ltd), Dec. 27, 1993.

Database WPI, Derwent Publications Ltd. XP000274621 and JP 60233131A (Mitsui Toatsu Chem Inc), Nov. 19, 1985.

Database WPI, Derwent Publications Ltd. XP00219064 and JP 02276841A, (Oji Yuka Goseishi KK), Nov. 13, 1990.

Database WPI, Derwent Publications Ltd, XP002190641 and JP 04028743A (Sumitomo Chem Co Ltd), Jan. 31, 1992.

*Primary Examiner*—James J. Seidleck
*Assistant Examiner*—Olga Asinovsky
(74) *Attorney, Agent, or Firm*—Jacobson Holman PLLC

(57) ABSTRACT

Product, method and use of a copolymer AB as a compatibilizing agent between a polar thermoplastic polymer C and a polyolefine D. The method of making AB comprise the steps of: a) melting a copolymer (A) comprising a larger amount of methylmethacrylate units and a smaller amount of functional vinyl or (meth)acrylate units wherein functional moiety is selected in the group consisting of (a hydroxyl, a carboxylic, a glycidyl or an amine functional group); together with maleic anhydride grafted polypropylene (B) allowing condensation reaction to occur between the functions under "A" and the anhydride under "B"; b) the condensation copolymer obtained under a) is further melt together with the two polymers C and D to be homogenized, or melt processed as an interlayer between the two molten polymers.

10 Claims, No Drawings

UNIVERSAL COMPATIBILIZING AGENT FOR POLYOLEFINES AND POLAR PLASTICS

This is a nationalization of PCT/EP01/10444, filed Sep. 10, 2001and published an English, which claims the benefit of provisional 60/231,902 filed Sep. 11, 2000.

Promoting the adhesion between two immiscible polymers has been a concern of increasing interest. Most useful applications are polymer alloying in very fine dispersion of one polymer into the other, and laminated structures and profiles obtained by coextrusion or colamination for example.

Various solutions have been proposed to induce some degree of interfacial bonding between two polymers exhibiting no or poor mutual adhesion. Among others, a favorite route is interleaving a third polymeric component whose segments provide good spontaneous adhesion with either component respectively. Master examples are di-block copolymers made by anionic polyaddition [references: S. H. Anastasiadis, I. Gancarz and J. T. Koberstein, *Macromolecules* 1989, 22, 1449–1453; C. Creton, E. J. Kramer, C.-Y. Hui and H. R. Brown, *Macromolecules* 1992, 25, 3075–3088]. Unfortunately, none of the existing commercial block copolymers is suitable to provide enough bonding strength between a polyolefine D such as polypropylene and a polar polymer C such as polyvinyl halide, polyvinylidene halide, poly(meth)acrylate, polyester, or polycarbonate.

It has been found surprisingly that a suitable compatibilizing agent AB of binary or ternary mixtures comprising at least one compound of the two above cited series of polymers C and D, can be obtained by the following way:

i. A copolymer (A) comprising a larger amount of methylmethacrylate units and a smaller amount of functional vinyl or (meth)acrylate units wherein the functional moiety is characterized as being a hydroxyl, a carboxylic, a glycidyl or an amine functional group.

ii. The copolymer A described under "i" is melt processed together with maleic anhydride grafted polypropylene (B) allowing condensation reaction to occur between the functions under "i" and the anhydride under "ii".

iii. The new segmented multiblock copolymer obtained under "ii", is further melt processed together with the two polymers C and D to be homogenized, or melt processed as an interlayer between the two molten polymers.

Accordingly, the present invention provides a method of making a copolymer AB as a compatibilizing agent between a polar thermoplastic polymer C and a polyolefine D comprising the steps of:

a) melting a copolymer (A) comprising a larger amount of methylmethacrylate units and a smaller amount of functional vinyl or (meth)acrylate units wherein functional moiety is selected in the group consisting of (a hydroxyl, a carboxylic, a glycidyl or an amine functional group);

together with maleic anhydride grafted polypropylene (B) allowing condensation reaction to occur between the functions under "A" and the anhydride under "B";

b) the condensation copolymer obtained under a) is further melt together with the two polymers C and D to be homogenized, or melt processed as an interlayer between the two molten polymers.

In a preferred embodiment of the invention, the copolymer A contains 0.02 to 6 (x) mole percent of structural units bearing the functional group, the grafted copolymer B contains from 0.2 to 3 (y) mole percent of maleic anhydride units, the ratio of copolymer A and grafted copolymer B in the multiblock copolymer AB is such that the ratio x over y lies between 10 and 1 and preferably between 6 and 2.

In another preferred embodiment of the invention, the copolymer A contains between 0.1 to 6 mole percent of 2-hydroxyethyl(meth)acrylate and its weight average molecular weight (measured as PS equivalent molecular weight) is between 40000 and 500000 g/mol, preferably between 150000 and 500000 g/mol.

The copolymer A is easily obtained for example by solution polymerization in a suitable solvent such as methylethylketone (MEK), using a thermal initiator.

The present invention also provides a use of copolymer AB as defined above as a compatibilizing agent between a polar thermoplastic polymer C like polyvinyl halide homo or copolymer, polyvinylidene halide homo or copolymer, poly(meth)acrylate, polyester, or polycarbonate and a polyolefine D as single polymer or in blend with other polyolefines.

Polyolefine D can be polypropylene homo or copolymer with one or more co-monomer and made either with Ziegler-Natta catalyzer or with single site catalyzer. Polypropylene copolymer can have random or multisequence structure including the reactor made copolymer known as block copolymer.

Polyolefine D can also be a homo polyethylene or a co-polyethylene with zero to 50 wt % of a co-monomer with a number of carbones from 3 to 20.

Endly polyolefine D can be a blend of a polymer D defined above with a polyolefinic rubber like EPDM, butyl rubber, BR, SBR.

Maleic anhydride grafted polypropylene is available in various grades and can be supplied by DuPont under the trademark FUSABOND®, by Exxon under the trademark EXXELOR®, by Uniroyal under the trademark POLYBOND®, by Atofina under the trademark OREVAC™ for example.

EXAMPLE 1

In a 2 liter stirred reactor, 840 g of methylethylketone, 274 g of methylmethacrylate, 6 g of 2-hydroxyethylmethacrylate (HEMA) and 2.8 g of azobis(isobutyronitrile) are introduced. The oxygen is removed by flushing dry nitrogen in the solution, The temperature is raised to 66° C. The solution is reacted over 24 hours at 66° C. An additional 1.4 g of azobis(isobutyronitrile) is added to the solution and the reaction is carried on during 12 more hours. The copolymer is recovered by precipitation of the solution in deionized water as non solvent and then dried. The yield obtained is 95% for the methylmethacrylate and 100% for the HEMA. The copolymer is characterized 5 by weight average molecular weight of 152000 g/mol as measured by gel permeation chromatography.

The reactive melt processing leading to the copolymer AB is carried on by mixing 200 g of copolymer A, as prepared following the above description, and 100 g of copolymer B, FUSABOND® MD-353D, on a two roll mill at 180° C. during 30 minutes.

Sandwich elements consisting of a polypropylene sheet (1 mm thick) and a polyvinylidene fluoride sheet (2 mm thick) are bonded with a thin film (100 microns thick) of copolymer AB. The sandwiches are bonded by pressing the above construction during 15 minutes at 150° C. The adhesion between the two sheets is tested by means of a U-peel test (reference: S. Wu, *Polymer interface and adhesion*, M. Dekker Inc., New York, 1982). A fracture energy (G) of 1607 $J/m^2$ has been measured.

EXAMPLES 2 TO 5

In the example 2 to 4, the same experimental procedure as described in the example 1 has been followed. The HEMA amount introduced in the copolymer A is varied (see the following table) as well as the weight average molecular weight, by means of a transfer agent (dodecanethiol-DDT). The measured fracture energies (G) are given for each example.

| Example number | mol % HEMA in copolymer A | wt % DDT[a] | Mw (g/mol) of copolymer A | x/y | G (J/m$^2$) |
|---|---|---|---|---|---|
| 2 | 1.68 | 0.49 | 94000 | 2.3 | 1036 |
| 3 | 1.76 | 0.17 | 222000 | 2.4 | 1513 |
| 4 | 5.09 | 0 | 172000 | 5.4 | 1659 |
| 5: without copolymer | — | — | — | — | 63 |

[a]This percentage is relative to the initial total mass of monomers used in the synthesis of copolymer A.

EXAMPLE 6

The blending of polyvinylidene fluoride with polypropylene is evaluated with and without using the copolymer AB. In particular, the blend of 19 weight percent of polyvinylidene fluoride, 76 weight percent of polypropylene and 5 weight percent of a copolymer AB (copolymer number 5 in the table presented above) prepared on a two roll mill (roll diameter: 110 mm; temperature: 180° C.; roll speed: 15 rpm; gap: 1 mm) leads to a two phase material presenting particles whose diameter ranges between 3 and 10 μm whereas the blending of polyvinylidene fluoride and polypropylene without copolymer displays particles characterized by a larger diameter, between 15 and 80 μm.

What is claimed is:

1. Method of making a copolymer AB as a compatibilizing agent between a polar thermoplastic polymer C and a polyolefine D comprising the steps of:
    a) melting a copolymer A comprising a larger amount of methylmethacrylate units and a smaller amount of functional vinyl or (meth)arcylate units wherein functional moiety is selected in the group consisting of a hydroxyl, a carboxylic, a glycidyl and an amine functional group;
    together with maleic anhydride grafted polypropylene B allowing condensation reaction to occur between the functions under "A" and the anhydride under "B",
    b) the condensation copolymer obtained under a) is further melt together with the two polymers C and D to be homogenized, or melt processed as an interlayer between the two molten polymers.

2. Method according to claim 1 wherein the copolymer A contains 0.02 to 6 (x) mole percent of structural units bearing the functional group, the grafted copolymer B contains from 0.2 to 3 (y) mol percent of maleic anhydride units, the ratio of copolymer A and grafted copolymer B in the multiblock copolymer AB is such that the ratio x over y lies between 10 and 1 and preferably 6 and 2.

3. Method according to claim 2 wherein the copolymer A contains between 0.1 to 6 mole percent of 2-hydroxyethyl (meth)acrylate and its weight average molecular weight is between 40000 and 500000 g/mol, preferably between 150000 and 500000 g/mol.

4. A method of using copolymer AB obtained by the method according to claim 1 as a compatibilizing agent between a polar thermoplastic polymer C and a polyolefine D comprising the step of melting the copolymer AB together with the polymers C and D to be homogenized or melt processed as an interlayer between the molten polymers C and D.

5. The method of using copolymer AB according to claim 4 wherein the polyolefine D is a polypropylene homo or a copolymer with one or more co-monomer.

6. The method of using copolymer AB according to claim 4 wherein the polyolefine D is a homo polyethylene or a co-polyethylene with zero to 50 wt % a co-monomer with a number of carbon from 3 to 20.

7. The method of using copolymer AB according to claim 4 wherein the polyolefine D is a blend with a polyolefinic rubber.

8. The method of using copolymer AB according to claim 7 with a rubber phase partially or fully crosslinked.

9. The method of using copolymer AB according to claim 4 with additive like inorganic filler and well known polymer stabilizers.

10. Copolymer AB obtained by the method according to claim 1.

* * * * *